United States Patent Office 3,235,475
Patented Feb. 15, 1966

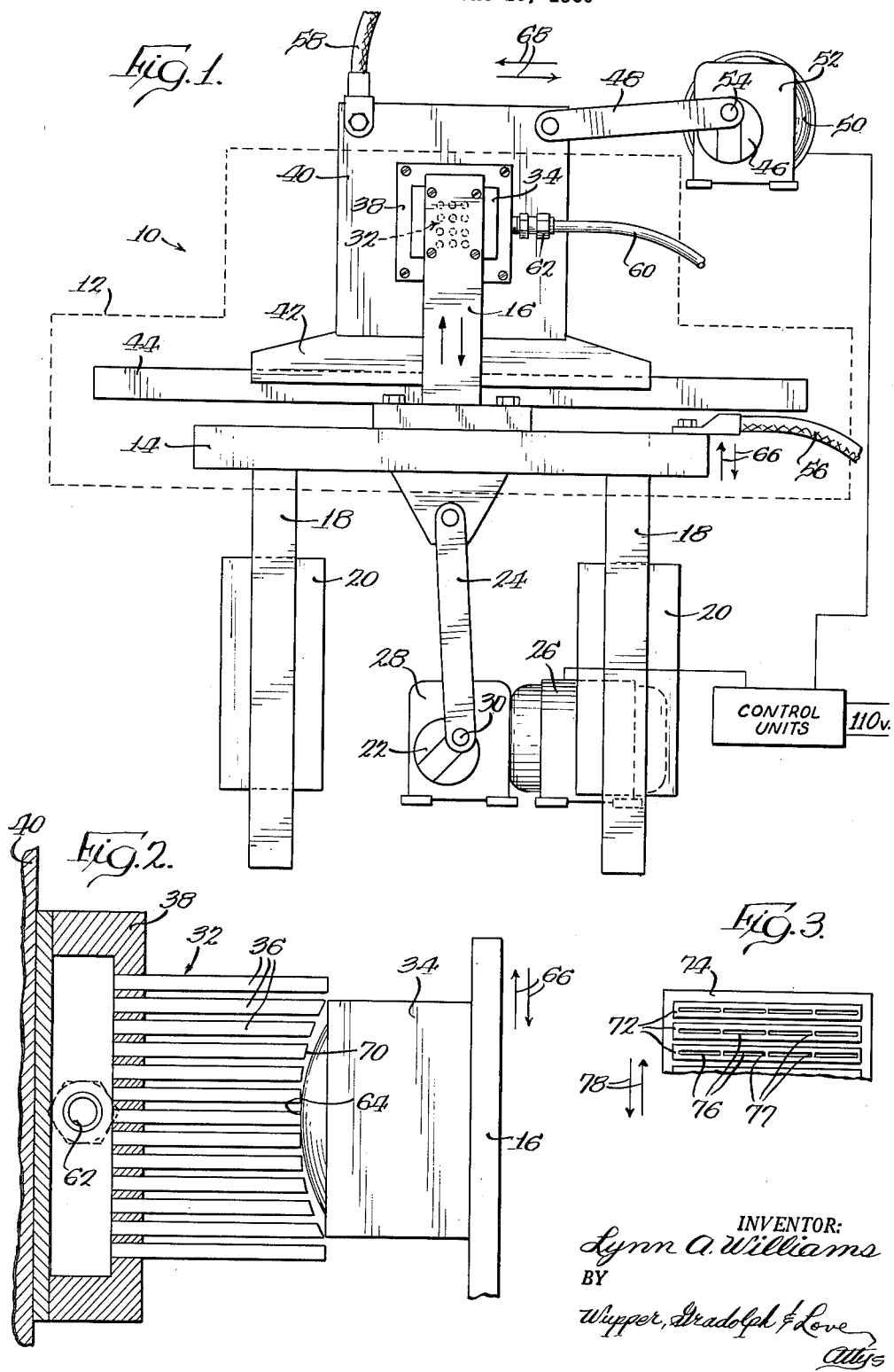

3,235,475
ELECTROLYTIC SHAPING APPARATUS
AND METHOD
Lynn A. Williams, Winnetka, Ill., assignor to Anocut
Engineering Company, Chicago, Ill., a corporation of
Illinois
Filed June 15, 1960, Ser. No. 36,314
8 Claims. (Cl. 204—143)

The resent invention relates generally to the art of electrolytic shaping and in particular to a novel electrode and method of making and using this electrode for the shaping of contoured workpieces. Apparatus of the type to which the present invention pertains is more fully disclosed in the copending application of Lynn A. Williams, Serial No. 772,960, filed November 10, 1958, for "Electrolytic Shaping," issued as Patent No. 3,058,895, dated October 16, 1962.

In general, apparatus of the type disclosed in the foregoing application includes a fixture for securely mounting the workpiece, a hollow electrode having a working tip of electrically conductive material, a ram head mounting the electrode for movement relative to the workpiece, an electric power supply connected to the electrode and to the workpiece so as to make the workpiece anodic and the electrode cathodic and capable of delivering a low voltage (5 to 15 volts), high density (500 to 8000 amperes per square inch) direct current, and a source of electrolyte connected to the input side of the electrode and capable of delivering electrolyte at a high velocity in the work gap and at a pressure of about 150 to 200 pounds per square inch. In the shaping of contoured workpieces such as turbine blades the electrode tip is complementally shaped. This shaping may be effectively accomplished by bringing the electrode into a position close to a master part with the electrical connections reversed from normal, i.e., with the electrode anodic or positive and the master part cathodic or negative. The electrode will be eroded to take the shape of the master part. Thereupon, when the polarity is restored to its normal direction and when the master is replaced by a workpiece, the electrode will remove material from the workpiece in such a way as substantially to duplicate the original master.

This technique works quite well, particularly where the contours are shallow and not too abrupt and not too detailed. However, there is a natural tendency of the electrode to leave an imprint on the workpiece. If the electrode is a tube bundle, then the pattern of the tubes will appear in the workpiece. This may be blurred to some extent by dwelling the electrode in the workpiece without additional infeed, but the pattern remains visible and can be felt. The height of the pattern when scanned with a dial indicator ranges from about .002" to as much as .007" from the low point to the high point of the pattern.

This pattern is undesirable in finished and in precision work, and it has been found that it may be obliterated by moving the electrode transversely with respect to the workpiece by a distance equal to one-half the diameter of a tube plus one-half the spacing distance between tubes. It is desirable that the transverse motion be a little more than this and that the motion be in two planes and even diagonally. This motion may be a slow motion, and a movement of 1/16" may be made in 10 to 15 seconds at the most and then it is moved back an equal distance in the same time. Good results in obliterating the electrode pattern have been obtained with a forward and backward motion accamplished in two to three seconds for 10 to 15 cycles.

The effect of this operation, however, is to distort the form which is reproduced in the workpiece so that it no longer accords with the form in the master part.

It is the principal object of the present invention to overcome the difficulties encountered in electrically shaping a contoured or compound surface.

Another object is to provide a new and improved apparatus and method for electrolytically shaping a contoured or compound surface in a workpiece without leaving the electrode pattern on the shaped surface.

Another object is to provide a new and improved apparatus and method for electrolytically shaping a contoured or compound surface in a workpiece having means operable in two directions, so as to obliterate both horizontal and vertical marking in the workpiece, to apply the same motion to the electrode during the time when it is being shaped as is applied to it during the time when it is shaping a workpiece.

Another object is to provide a new and improved apparatus and method for electrolytically shaping an electrode with a contoured or compound surface from an original master and reproducing on a workpiece a surface substantially identical in shape and size as that of the original master.

Other objects and advantages will become apparent from the following description taken in conjunction with the accompanying drawing, wherein:

FIG. 1 is a somewhat schematic illustration of an electrolytic shaping apparatus incorporating the improvements of the present invention;

FIG. 2 is a greatly enlarged sectional view on a vertical plane through the electrode, the work holder and a master part or workpiece; and FIG. 3 is a fragmentary elevational view of the active face of a different form of electrode.

In the drawing there is shown in FIG. 1 a schematic representation of those parts of an electrolytic shaping apparatus indicated generally by the reference character 10 as would be necessary to an understanding of the invention herein. Such apparatus is more completely disclosed in the aforementioned patent application Serial No. 772,960, now Patent No. 3,058,895. It includes a machine frame 12 on which is mounted a table 14 to which a workpiece holder 16 is fixed. The table 14 is mounted for vertical reciprocation on a pair of supports 18 which are slidably guided in ways 20 secured to the frame 12. The table 14 is moved vertically by a crank 22 through a connecting rod 24; the crank 22 is driven by an electric motor 26 through a variable reducing gearing 28 so that the rate of reciprocation of the table can be adjusted to a frequency of not more than 20 to 30 cycles per minute and as low as 5 cycles per minute. It should be noted that the connection 30 between the crank 22 and the connecting rod 24 is adjustable so that the extent of travel or length of stroke of the table 14 may be adjusted in accordance with the physical characteristics of the electrode being used.

A hollow, multiple passage electrode 32 is mounted for movement at a constant speed relatively toward a workpiece or original master part 34 which is mounted on or in the work holder 16. The electrode in the particular arrangement shown is movable and is driven by a ram powered from a positively driven screw (not shown). The electrode 32 comprises a bundle of small diameter conductive tubes 36 having their inner ends fixed in hollow electrode holder 38. The electrode holder is mounted on a conductive ram plate 40 which is fixed to the forward end of the ram and is insulated therefrom.

The assembly of the ram, ram plate 40, electrode holder 38 and electrode 32 is mounted on a pedestal 42 which is slidable transversely of the axis of the electrode 32 and the direction of its movement toward the workpiece on ways 44 carried by the frame 12. Transverse reciprocatory movement is imparted to this assembly by a crank 46 connected to the assembly by a connecting rod 48. The crank 46 is driven by an electric motor 50 through a variable speed reducing gearing 52, and it has an adjustable connection 54 with the connecting rod 48 whereby the rate and distance of transverse reciprocation of the electrode may be adjusted in the same manner as may be done with the table 14.

Low voltage, high density direct current is supplied to the electrode 32 and to the workpiece or master part 34 from a source (not shown) through cables 56 and 58, the cable 56 being connected to the table 14 and the cable 58 being connected to the conductive ram plate 40. When electrolytic shaping of a workpiece is in process, the electric connections will be such as to make the workpiece anodic or positive and the electrode 32 cathodic or negative. When the electrode 32 is being contoured electrolytically, the cable connections are reversed either by interchanging jack plugs at the power supply or through a reversing switch so as to make the electrode anodic and the original master cathodic.

During the electrolytic shaping of a workpiece or an electrode, electrolyte is supplied to and through the electrode at a high velocity in the work gap and under high pressure from a source of electrolyte supply including a tank and pump (not shown) through a flexible tube 60 connected by means of a fitting 62 to the hollow electrode holder 38.

As noted previously an electrode formed of a bundle of small tubes 36, which may be copper tubes having an outside diameter of as much as 1/16" and as small as .025" spaced close together, 1/64" for larger tubes and .010" for smaller tubes, will leave a polka dot like pattern on the workpiece which can be obliterated by relative transverse movement of the electrode and workpiece. To prevent distortion of the workpiece dimensions and shape the apparatus of this invention is used in the following manner.

A master part 34 having a contoured or compound surface 64 to be reproduced is mounted on the work holder 16 and an electrode 36 and its holder 38 are mounted on the ram plate 40. The electrical connections are such as to make the electrode anodic and the master cathodic. The power supply and electrolyte source are energized, and the motors 26 and 50 are simultaneously energized through the circuit diagrammatically shown in FIG. 1; the electrode is advanced toward the compound surface 64. This surface 64 is reciprocating vertically as indicated by the arrows 66 and the electrode is reciprocating horizontally as indicated by the arrows 68. The rates of reciprocation may be in the range between 5 to 30 cycles per minute. The stroke imparted to both the electrode and the master preferably should be equal to or slightly longer than one-half the diameter of the electrode tube 36 plus one-half the spacing distance between adjacent tubes. These reciprocatory movements of the electrode 32 on the master 34 contour the outer ends of the electrode tubes 36 into a shape 70 which is similar to the surface 64 but is less sharp or more gradual in its curves than the surface 64 as can be seen in FIG. 2.

After the electrode 32 has been shaped it is left in its normal position on the ram plate 40 and the original or master part is replaced on the work holder 16 with a workpiece. The electrical connections from the power supply to the electrode 32 and the work holder 16 are reversed to their normal positions so that the workpiece is anodic and the electrode cathodic. No change is made in the reciprocation distances or rates of the electrode 32 and the workpiece holder 16. As the electrode approaches the workpiece its contoured surface 70 forms a contoured or compound surface 64 on the workpiece which is substantially identical in size and shape to that of the corresponding surface on the original or master part.

Where the electrode is made of a tube bundle arranged in a regular or a rectangular pattern it is preferred that the frequency of reciprocation be random and not synchronized. For example, if the frequency of the electrode be 10 per minute, that of the work holder might be 12 or 13 per minute. These are merely illustrative and are not intended to be limitative. In this way the regular or rectangular arrangement of the tubes 36 will not produce a diagonally ridged pattern in the workpiece which could appear if the electrode and workpiece movements were completely synchronized.

In FIG. 3 there is shown a portion of the active face of another type of electrode comprising a group of elongated copper elements 72 about 1/8" thick (the vertical direction on the drawing) carried by an electrode holder 74. The elements are spaced apart about .020" and are formed with electrolyte slots 76 about 3/8" in length and .020" to .030" wide and arranged to extend substantially the length of each element. The slots 76 are interconnected at their ends by narrow webs 77 about 1/64" wide so as not to have any significant pattern on the workpiece. These webs which prevent distortion of the walls of the electrode from electrolyte pressure may be wider within the element 72. This electrode will produce, if not properly reciprocated, a pattern of ridges in the work from the spaces between the elements 72. Then, the electrode should be reciprocated in the direction of the arrows relative to the workpiece, and if a contoured surface is to be formed this direction is used in shaping the electrode and subsequently the workpiece.

It should be appreciated that in shaping an electrode the relative reciprocating movement between the electrode and the master part should be transverse to any pattern the electrode would leave in the workpiece, which usually means that the movement is transverse to the long dimension of the electrode outlets. This frequently will necessitate compound or dual reciprocating motions as was noted in the case of the tube bundle electrode 32. It has been found in practice that when a laminated electrode, such as those disclosed in the copending application of Lynn A. Williams, Serial No. 800,276, filed March 18, 1959, entitled "Electrode for Electrolytic Hole Sinking" (now abandoned), is to be shaped, the electrode-master and electrode-workpiece relative movement is to be transverse to the electrode laminations and reciprocation in the other direction may be eliminated. It should also be appreciated that the same reciprocatory motions used in shaping the electrode must subsequently be used in shaping the workpiece faithfully to reproduce the master part.

It will thus be observed that the advantages which were claimed for this invention at the outset of this specification have been fully attained.

While a preferred embodiment of the new and improved electrolytic shaping apparatus and method constituting the present invention has been shown and described, it will be apparent that numerous modifications and variations may be made therein without departing from the underlying principles of the invention. It is, therefore, intended by the following claims to include all such variations and modifications by which substantially the results of this invention may be obtained through the use of the same or equivalent means.

What is claimed as new and desired to be secured by United States Letters Patent is:

1. In an apparatus for electrolytically shaping a contoured surface on a conductive workpiece to conform in size and shape to a master, a hollow conductive electrode, a work holder adapted successively to hold a master and at least one workpiece, means mounting said electrode and said work holder for movement relatively toward and away from each other, means mounting each of said electrode and said work holder for random reciprocation in different directions transverse to said movement and within the transverse dimensions of the electrode, power means connected to said electrode for reciprocating said electrode, second power means connected to said work holder for reciprocating said work holder, control means connected to said first and second power means to insure that both said power means operate simultaneously to reciprocate said electrode and said work holder, means conected to said electrode for pumping electrolyte therethrough to the work gap between said electrode and either a master or a workpiece, and electric power supply means including means for reversing the polarity of the output thereof connected to said electrode and to said work holder, said power supply means passing a low voltage direct current between said electrode and a master mounted on said work holder in a sense to make said electrode anodic thereby to contour the active face of the electrode, and subsequently said power supply means passing a low voltage direct current between said electrode and a workpiece mounted on said work holder in a sense to make said electrode cathodic thereby to contour the workpiece to the same size and shape as the master, while said electrode and said work holder are being reciprocated simultaneously with the same movements and at the same rates as were used in contouring said electrode.

2. In an apparatus for electrolytically shaping a contoured surface on a conductive workpiece to conform in size and shape to a master, a conductive electrode having multiple passages therethrough, a work holder adapted successively to hold a master and a plurality of workpieces, means mounting said electrode and said work holder for movement relatively toward and away from each other, means mounting each of said electrode and said work holder for reciprocatory movement in different directions transverse to said first named movement and within the transverse dimensions of said electrode, power means connected to said electrode for reciprocating said electrode, second power means connected to said work holder for reciprocating said work holder, control means connected to said first and second power means to insure that both said power means operate simultaneously to reciprocate said electrode and said work holder, means connected to said electrode for pumping electrolyte therethrough under pressure and to the work gap between said electrode and the master or a workpiece, and electric power supply means including means for reversing the polarity of the output thereof connected to said electrode and to said work holder, said power supply means passing a low voltage direct current between said electrode and a master mounted on said work holder in a sense to make said electrode anodic thereby to contour the active face of the electrode, and subsequently said power supply means passing a low voltage direct current between said electrode and a workpiece mounted on said work holder in a sense to make said electrode cathodic thereby to contour the workpiece to the same size and shape as the master, while said electrode and said work holder are simultaneously being reciprocated with the same movement and at the same rates as were used in contouring said electrode.

3. In an apparatus for electrolytically shaping a contoured surface on a conductive workpiece to conform in size and shape to a master, a conductive electrode having multiple passages therethrough, a work holder adapted successively to hold a master and a plurality of workpieces, means mounting said electrode and said work holder for movement relatively toward and away from each other, means mounting said electrode and said work holder for movement in directions transverse to said first named relative toward and away movement, means connected only simultaneously to reciprocate said electrode and said work holder at unsynchronized cycles and strokes in said last named direction and within the transverse dimensions of said electrode, means connected to said electrode for pumping electrolyte therethrough under pressure to the work gap between said electrode and either a master or a workpiece, and electric power supply means including means for reversing the polarity of the output thereof connected to said electrode and to said work holder, said power supply means passing a low voltage direct current between said electrode and a master mounted on said work holder in a sense to make said electrode anodic thereby to contour the active face of the electrode, and subsequently said power supply means passing a low voltage direct current between said electrode and a workpiece mounted on said work holder in a sense to make said electrode cathodic thereby to contour the workpiece to the same size and shape as the master while said electrode and said work holder are simultaneously being reciprocated with the same cycles and strokes as were used in shaping said electrode.

4. In an apparatus for electrolytically shaping a contoured surface on a conductive workpiece to conform in size and shape to a master, a conductive electrode having multiple passages therethrough, a work holder adapted successively to hold a master and a plurality of workpieces, means mounting said electrode and said work holder for movement relative toward and away from each other, means mounting said electrode for movement in a direction transverse to said first named relative movement, means mounting said work holder for movement in a direction transverse to both said relative toward and away movement and said transverse electrode movement, separate means connected to said electrode and to said work holder for reciprocating said electrode and said work holder in random cycles and strokes and within the transverse dimensions of said electrode, control means connected to both said separate means to insure that both said separate means operate simultaneously to reciprocate said electrode and said work holder, means connected to said electrode for pumping electrolyte therethrough under pressure to the work gap between said electrode and either a master or a workpiece, and electric power supply means including means for reversing the polarity of the output thereof connected to said electrode and to said work holder, said power supply means passing a low voltage direct current between said electrode and a master mounted on said work holder in a sense to make said electrode anodic thereby to contour the active face of the electrode, and subsequently said power supply means passing a low voltage direct current between said electrode and a workpiece mounted on said work holder in a sense to make said electrode cathodic thereby to contour the workpiece to the same size and shape as the master while said separate means randomly and simultaneously reciprocate said electrode and said work holder with the same cycles and strokes as were used in shaping said electrode.

5. In the method of electrolytically shaping a contoured surface on at least one workpiece to conform in size and shape to a master, comprising moving the active face of a hollow electrically conductive electrode toward a conductive master, pumping an electrolyte into the work gap between the electrode and the master under a high pressure and at high velocity, passing a low voltage, high density direct electric current between the electrode and the master in a sense to make the electrode anodic, relatively transversely moving the electrode and the master across the long dimension of the electrolyte passage in the electrode and within the transverse dimension of the electrode while relatively moving the electrode and master toward each other, thereby to contour the active face of the electrode, thereafter, substituting a workpiece for the master, reversing the polarity of the electric current so that the workpiece is anodic and the electrode cathodic to pass a low voltage, high density direct current between the workpiece and the electrode, relatively moving the electrode and the workpiece toward each other while pumping the electrolyte into the work gap between the electrode and the workpiece, and simultaneously transversely moving the electrode and the workpiece with the same movements and at the same rate as the electrode and the master were transversely moved, thereby to form a contoured surface on the workpiece substantially identical with the contoured surface on the master.

6. In the method of electrolytically shaping a contoured surface on a plurality of workpieces to conform in size and shape to a master, comprising moving the active face of a multiple passage electrically conductive electrode toward a conductive master, pumping an electrolyte into the work gap between the electrode and the master under a high pressure and at high velocity, passing a low voltage, high density direct electric current betwen the electrode and the master in a sense to make the electrode anodic, relatively transversely moving the electrode and the master across the long dimensions of the electrolyte passages in the electrode and within the transverse dimensions of the electrode while relatively moving the electrode and master toward each other, thereby to contour the active face of the electrode, thereafter, substituting successive workpieces for the master, reversing the polarity of the electric current so that each workpiece is anodic and the electrode cathodic to pass a low voltage, high density direct current between the workpiece and the electrode, relatively moving the electrode and the workpiece toward each other while pumping the electrolyte into the work gap between the electrode and the workpiece, and simultaneously transversely moving the electrode and the workpiece with the same movements and at the same rate as the electrode and the master were transversely moved, thereby to form a contoured surface on the workpiece substantially identical with the contoured surface on the master.

7. In the method of electrolytically shaping a contoured surface on at least one workpiece to conform in size and shape to a master, comprising moving the active face of a multiple passage electrically conductive electrode toward a conductive master, pumping an electrolyte into the work gap between the electrode and master under a high pressure and at high velocity, passing a low voltage, high density direct electric current between the electrode and the master in a sense to make the electrode anodic, relatively transversely moving the electrode and the master in at least two angularly disposed planes and within the transverse dimensions of the electrode while relatively moving the electrode and the master toward each other, thereby to contour the active face of the electrode, thereafter, substituting a workpiece for the master, reversing the polarity of the electric current so that the workpiece is anodic and the electrode cathodic to pass a low voltage, high density direct current between the workpiece and the electrode, relatively moving the electrode and the workpiece toward each other while pumping the electrolyte into the work gap between the electrode and the workpiece, and simultaneously transversely moving the electrode and the workpiece with the same movements and at the same rates as the electrode and the master were transversely moved, thereby to form a contoured surface on the workpiece substantially identical wtth the contoured surface on the master.

8. In the method of electrolytically shaping a contoured surface on a plurality of workpieces to conform in size and shape to a master, comprising moving the active face of a multiple passage electrically conductive electrode toward a conductive master, pumping an electrolyte into the work gap between the electrode and master under a high pressure and at high velocity, passing a low voltage, high density direct electric current between the electrode and the master in a sense to make the electrode anodic, relatively, randomly transversely reciprocating the electrode and the master in at least two angulary disposed planes and within the transverse dimensions of the electrode while relatively moving the electrode and master toward each other, thereby to contour the active face of the electrode, thereafter, substituting successive workpieces for the master, reversing the polarity of the electrode so that each workpiece is anodic and the electrode cathodic to pass the low voltage, high density direct current between the workpiece and the electrode, relatively moving the electrode and the workpiece toward each other while pumping the electrolyte into the work gap between the electrode and the workpiece, and simultaneously reciprocating the electrode and the workpiece with the same random transverse movements and at the same rates as the electrode and the master were reciprocated, thereby to form a contoured surface on the workpiece substantially identical with the contoured surface on the master.

References Cited by the Examiner

UNITED STATES PATENTS

| 2,383,383 | 8/1945 | Harding | 219—69 |
| 2,385,198 | 9/1945 | Engle | 204—224 X |
| 2,490,302 | 12/1949 | Holfelder | 219—69 |
| 2,773,968 | 12/1956 | Martellotti | 219—69 |
| 2,800,566 | 7/1957 | Matulaitis | 219—69 |
| 2,826,540 | 3/1958 | Keeleric | 204—224 |
| 2,905,605 | 9/1959 | Keeleric | 204—224 |
| 2,909,641 | 10/1959 | Kucyn | 219—69 |

FOREIGN PATENTS 335,003  9/1930  Great Britain.

WINSTON A. DOUGLAS, *Primary Examiner.*

JOHN H. MACK, *Examiner.*

Dedication 3,235,475.—*Lynn A. Williams*, Winnetka, Ill. ELECTROLYTIC SHAPING APPARATUS AND METHOD. Patent dated Feb. 15, 1966. Dedication filed Dec. 23, 1971, by the assignee, *Anocut Engineering Company*.

Hereby dedicates to the Public the portion of the term of the patent subsequent to Dec. 24, 1971.

[*Official Gazette March 21, 1972.*]